United States Patent [19]

Ross et al.

[11] 4,434,712
[45] Mar. 6, 1984

[54] SILO BREATHER BAG

[75] Inventors: Ashley M. Ross, Highland Park; James A. McKee, Elmhurst, both of Ill.

[73] Assignee: Fabrico Manufacturing Corp., Chicago, Ill.

[21] Appl. No.: 352,788

[22] Filed: Feb. 26, 1982

[51] Int. Cl.³ .................... A01F 25/22; B65D 30/10
[52] U.S. Cl. .................... 99/646 S; 220/85 B; 383/903
[58] Field of Search .............. 150/0.5, 1; 220/85 B; 99/646 S

[56] References Cited

U.S. PATENT DOCUMENTS

| 1,928,640 | 10/1933 | Boardman | 150/0.5 X |
|---|---|---|---|
| 2,899,884 | 8/1959 | Herbruck | 99/235 |
| 3,158,188 | 11/1964 | Esty | 150/48 |
| 3,193,058 | 7/1965 | Ebbinghaus | 189/3 |
| 3,568,588 | 3/1971 | Kudeck | 99/235 |
| 3,888,288 | 6/1975 | Hickle et al. | 150/1 |
| 4,135,443 | 1/1979 | Warren | 99/646 S |
| 4,177,844 | 12/1979 | Kuss et al. | 150/1 |

Primary Examiner—William Price
Assistant Examiner—Sue A. Weaver
Attorney, Agent, or Firm—Dressler, Goldsmith, Shore, Sutker & Milnamow, Ltd.

[57] ABSTRACT

A breather bag having a partial torus or weiner-like configuration is fabricated from four panels of flexible material. One of the panels is a side panel extending from one end of the bag to the other end along the inner concave curvature of the bag. The side panel also defines, at each end of the bag, a generally convex end surface. An offset dart seam may be provided in each convex end surface.

5 Claims, 18 Drawing Figures

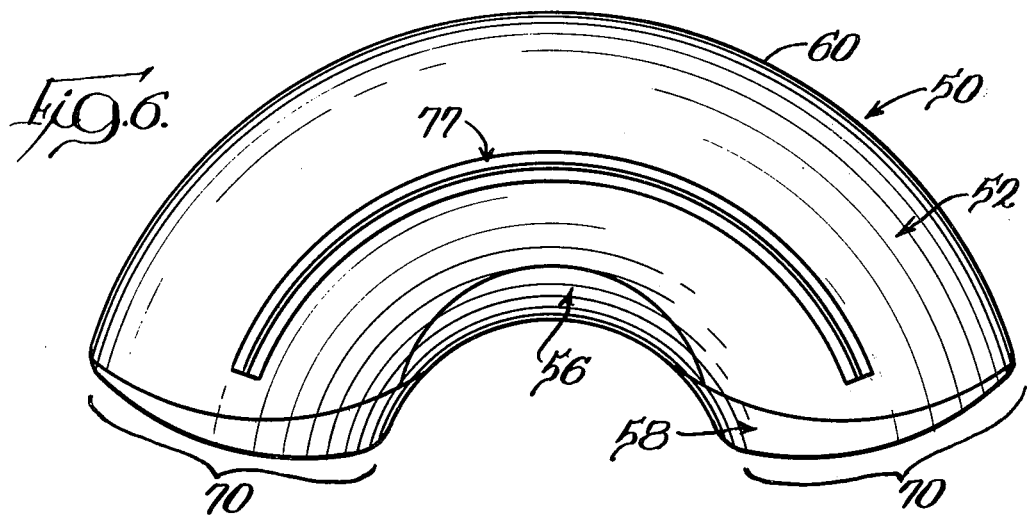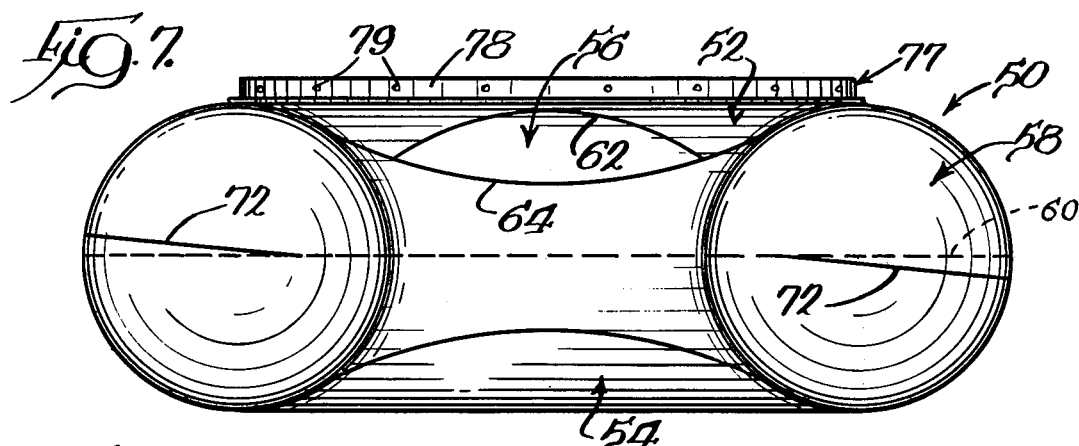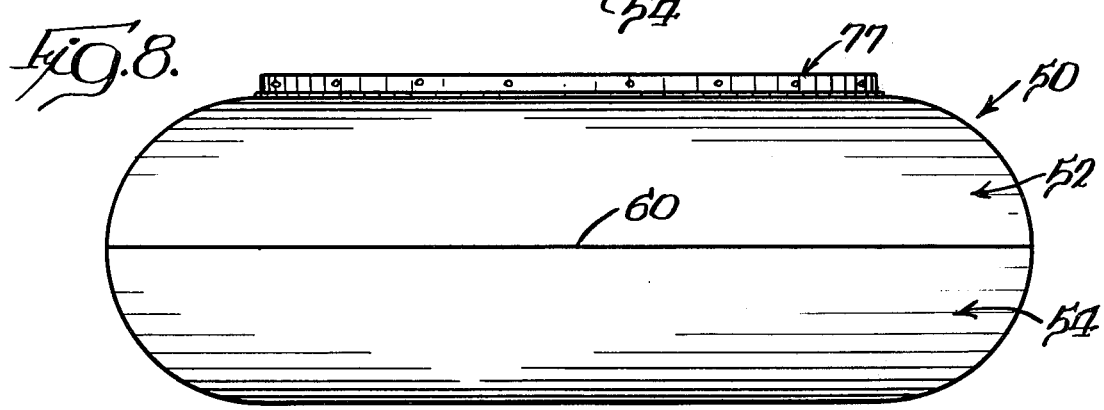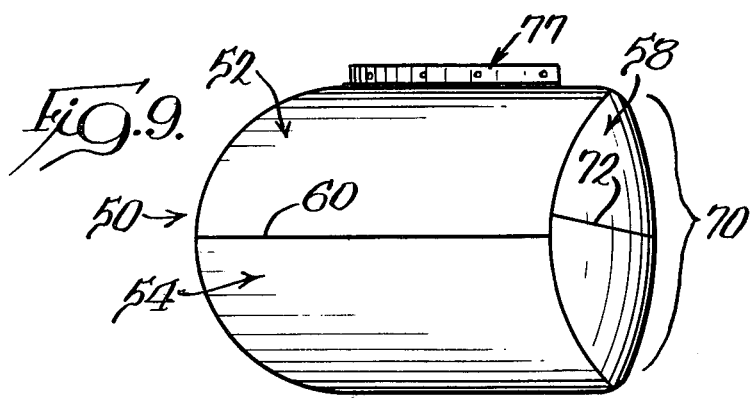

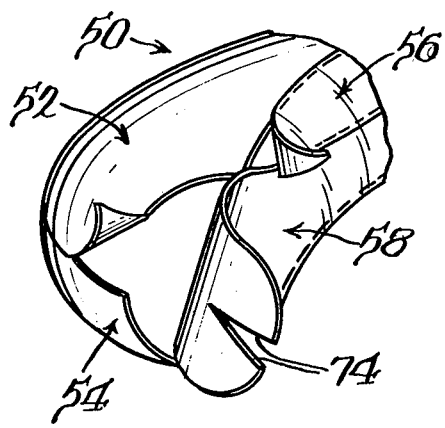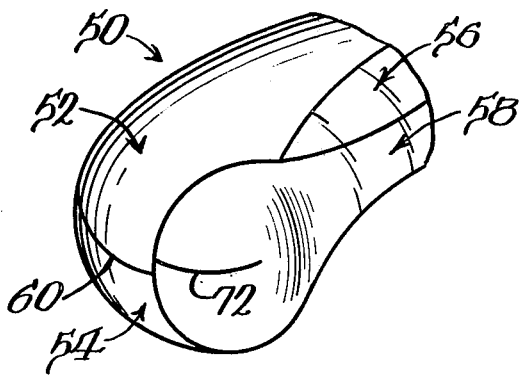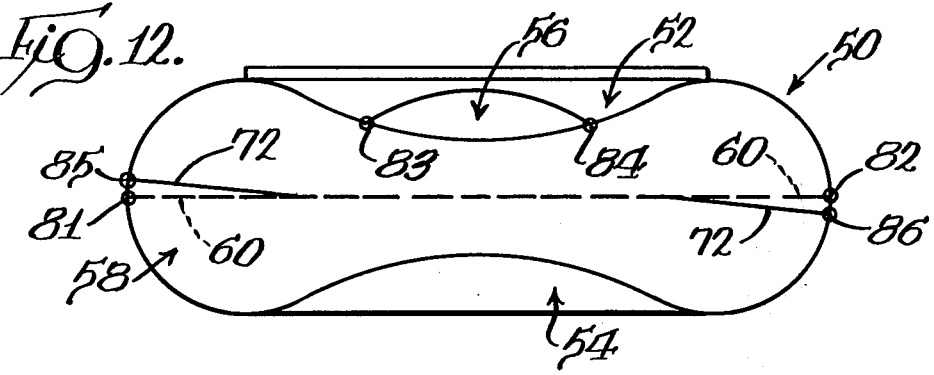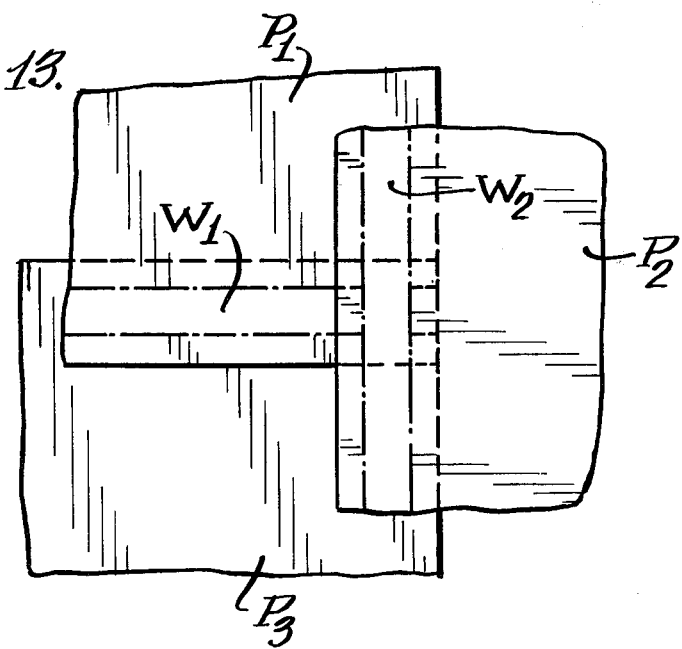

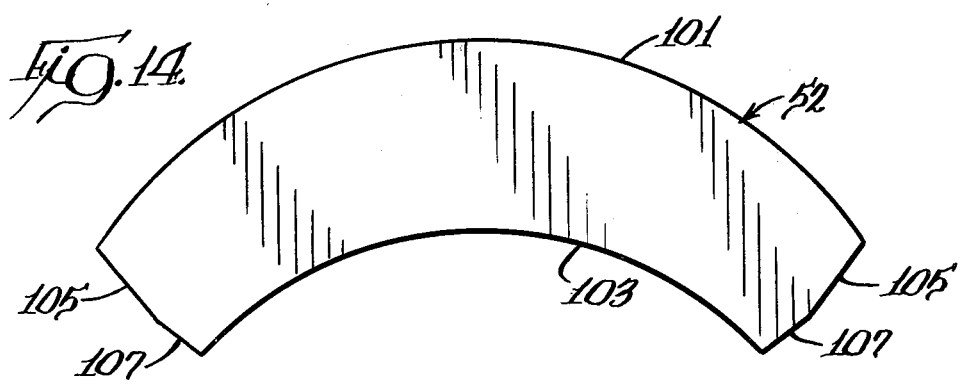
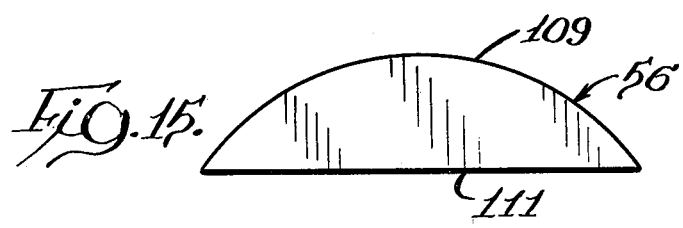
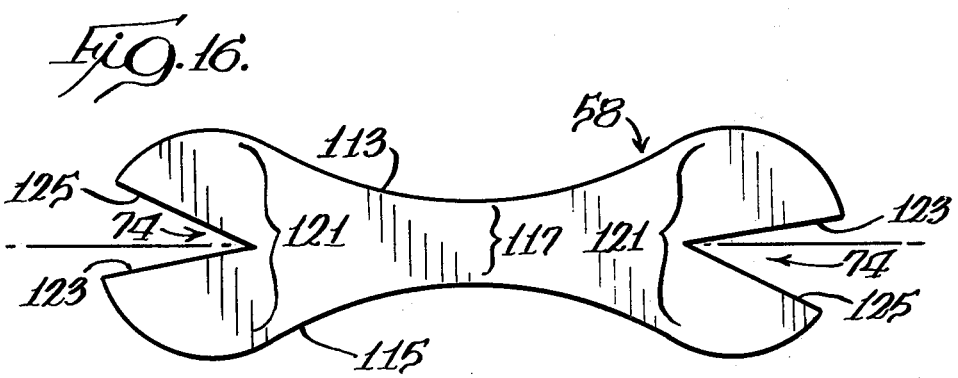
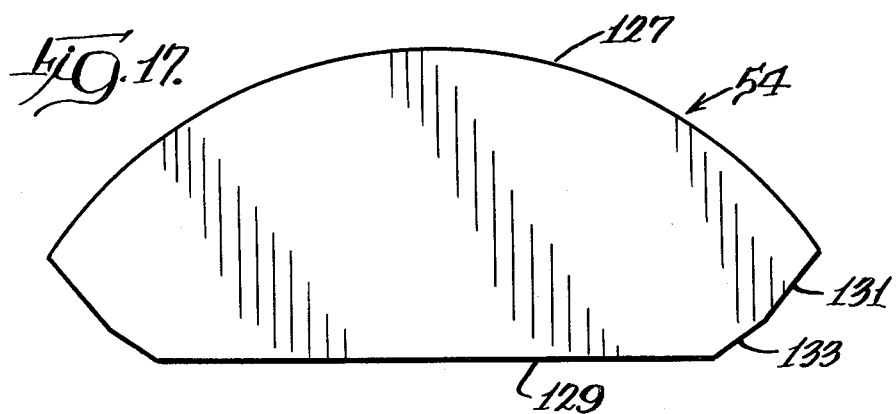

SILO BREATHER BAG

TECHNICAL FIELD

This invention relates to air breather bags for use in sealed silos.

BACKGROUND OF THE INVENTION

It is conventional practice to install one or more breather bags in a conventional sealed type of agricultural silo. The silo, being a generally upright cylindrical structure, is typically filled with silage or other material to some level below the inside top of the silo.

The silo is typically not completely filled with silage or other material so that there exists a free space or free volume at the top of the silo above the upper surface of the silage or other material. One or more breather bags, fabricated from a flexible thermoplastic material such as polyvinylchloride, are suspended in the free space at the top of the silo. The interior of each bag is open to the outside atmosphere, through a conduit connecting the bag to the roof of the silo, so that the bag can accommodate inflowing ambient air when the pressure in the silo is reduced below ambient air pressure and so that the bag can discharge air when the pressure within the silo is greater than the ambient air pressure.

It is desired to prevent spoilage of the silage in the silo. This is accomplished by providing a substantially airtight or leaktight silo structure to prevent ambient atmosphere from contacting the silage. However, a substantially airtight silo structure must be able to withstand changes in internal pressure. Specifically, any small amount of air remaining in the silo and the gases generated by the silage will expand or contract with changes in ambient temperature. When the temperature increases, the expanding gases cause an increase in internal silo pressure. Conversely, when the temperature decreases, the contracting gases cause a decrease in pressure.

The silo must therefore be designed to withstand a pressure increase which could cause the silo to explode. Similarly, the silo must be designed to withstand a pressure decrease which could result in an implosion of the silo.

The pressure changes are minimized by the use of the breather bag. Specifically, when the temperature decreases and the pressure tends to decrease within the silo, the higher pressure ambient air fills and inflates the breather bag within the silo so that the pressure within the silo does not significantly decrease. Conversely, when the temperature increases and the pressure within the silo tends to increase, the breather bag partially or completely collapses and the air is expelled therefrom. Thus, the pressure within the silo around the bag does not increase significantly.

One conventional type of silo breather bag that is widely used in the United States of America today has a generally partial torous or weiner-like configuration and is hung from the top of the silo from hooks arranged in an approximately semi-circular array around the top of the silo. Typically, two such bags are suspended in a silo end-to-end (but not interconnected) whereby the two separate bags together can be said to form a generally toroidal shape. Depending upon the bag length and upon the silo size, only one bag may be used in some cases, while in other cases, more than two bags may be used.

The silo breather bag must be designed to withstand the stresses imposed by the support system in addition to the stresses imposed by inflation. These weiner-like silo breather bags are typically fabricated from a plurality of pieces or panels of flexible polyvinylchloride material which are joined together with a sealed seam along overlapping edges. Typically the seams are effected with a heat seal or with a high frequency welding process. Of course, it is desired to fabricate a breather bag that will maintain its integrity and not fail at or adjacent such seams.

Although a breather bag may function satisfactorily during a normal use, it has been found that breather bags do fail in the field on occasion, as by rupturing or tearing, and such failures may be attributable to incorrect installation, abuse during installation, and the like. These failed bags must be replaced, preferably with a bag of similar shape so that the existing support structure can be used.

Further, it has been found that the ruptures or tears, when they do occur, are frequently located in the bags adjacent the panel seams. Thus, it would be desirable to provide an improved multi-panel breather bag construction that would better withstand abuse during installation and that would better withstand stresses arising from incorrect installation or from unexpected inflation pressure excursions.

With conventional breather bag construction, the seams must be properly formed along their entire length to ensure the integrity of the bag and to reduce the probability of the bag tearing or rupturing at or adjacent the seams. Consequently, it would be desirable, *ceteris paribus,* to provide a minimum number of seams and a minimum seam length so as to reduce the amount of seams that must be produced.

With some weiner-like breather bag configurations, there are places in the bag where three or more separate pieces or panels of material are joined together at one point. At these points an edge of each piece overlaps the edges of the other pieces.

A seam weld of three or more layers of polyvinylchloride panel material is of potentially greater concern than the overlapping seam weld of just two pieces of the material. Greater care must be taken when making a weld of three or more overlapping pieces to ensure that the weld satisfactorily joins all of the pieces. Further, owing to the greater bulk of material at the weld, it is believed that a weld of three or more pieces provides a more significant stress riser or discontinuity in the composite structure at or adjacent the welded seam than does a weld of just two pieces.

It has been determined that bags are more likely to fail at such welds of three or more panels than at, or along, welds of just two overlapping panels. Consequently, it would be desirable to provide a breather bag of improved construction in which the number of welds of three or more pieces of material is reduced to a minimum.

Although weiner-like or partial torous-shaped breather bags are preferably fabricated from a plurality of separate panels or pieces of polyvinylchloride material to more accurately and easily provide the desired inflated shape, the fabrication and assembly of many separate pieces or panels necessarily involves a substantial amount of labor and time. Accordingly, it would be desirable to provide a breather bag having a weiner-like configuration with a small number of separate panels so as to reduce the labor and time required for the fabrication of such a bag.

Further, it would be desirable to provide a breather bag in which the ratio of the edge length of each panel to the area of that panel is as small as possible. Additionally, it would be desirable to fabricate the panels in planar shapes that are not too complex and which require no, or relatively few, seams within each separate panel. This would reduce the labor and time required to fabricate each panel.

SUMMARY OF THE INVENTION

According to the teachings of the present invention, the tubular silo breather bag is provided for being inflated to a generally partial torous or weiner-like configuration. The bag comprises a flexible top panel and a flexible bottom panel sealed together with a seam along overlapping edges on the outer convex side surface, a flexible transition panel sealed to the top panel with a seam along overlapping edges, and a flexible side panel extending from one end of the bag to the other end along the inner radius surface or concave curvature of the bag and sealed with a seam along its peripheral edges to the top panel, bottom panel, and transition panels.

The side panel defines at each end of the bag a generally convex end surface. The side panel further includes a dart seam at each end in the convex end surface. Each dart seam originates within the side panel and extends to a peripheral edge of the side panel at a point offset from the outer convex side surface seam of the top and bottom panels.

The present invention will be better understood and important features other than those specifically enumerated above will become apparent when consideration is given to the following details and description which, when taken in conjunction with the drawings, describes, discloses, illustrates, and shows a preferred embodiment of the present invention and what is presently believed to be the best mode of practicing the principles of the invention. Other embodiments and modifications may be suggested to those having the benefit of the teachings herein, especially as they fall within the scope and spirit of the subjoined claims.

BRIEF DESCRIPTION OF THE DRAWINGS

In the accompanying drawings forming part of the specifications, and in which like numerals are employed to designate like parts throughout the same.

FIG. 6 is a top plan view of an inflated breather bag of the present invention;

FIG. 7 is a side view of the inner radius surface of the bag of FIG. 6;

FIG. 8 is a side view of the outer radius convex side surface of the breather bag of FIGS. 6 and 7;

FIG. 9 is an end view of one end of the breather bag of FIGS. 6–8;

FIG. 10 is a fragmentary, perspective view of an end of the breather bag of FIGS. 6–9 with portions of the panels separated to illustrate the seam configuration in an inflated bag;

FIG. 11 is a view similar to FIG. 10 but with the panels shown in the final, sealed seam position;

FIG. 12 is a schematic, elevational diagram of the inner radius surface of the bag to illustrate the weld of the overlapping region of three panels;

FIG. 13 is a greatly enlarged, fragmentary plan view of the weld of the overlapping region of three panels;

FIG. 14 is a plan view of the top panel laid out flat prior to being joined to other panels to form the bag of the present invention;

FIG. 15 is a plan view of the transition panel laid out flat prior to being joined to the other panels to form the bag of the present invention;

FIG. 16 is a plan view of the side panel laid out flat prior to being joined to the other panels to form the bag of the present invention;

FIG. 17 is a plan view of the bottom panel laid out flat prior to being joined to the other panels to form the bag of the present invention.

DETAILED DESCRIPTION

This invention may be used in many different forms. The specification and the accompanying drawings disclose one specific form as an example of the use of the invention. The invention is not intended to be limited to the embodiment illustrated, and the scope of the invention will be pointed out in the appended claims.

The precise shapes and sizes of the bag components herein described are not essential to the invention unless otherwise indicated. Unless otherwise indicated, the particular shapes and sizes are shown to best illustrate the principles of the invention.

For ease of description, the illustrated bags are described in a normal operating position and terms such as upper, lower, horizontal, etc. are used with reference to this position. It will be understood, however, that the bag of the present invention may be manufactured, stored, transported, and sold in an orientation other than the position described.

The choice of materials for constructing the bag of the present invention is dependent upon the particular application involved and upon other variables, as those skilled in the art will appreciate. However, one material which has been found to function well in most conventional breather bag applications is polyvinylchloride.

Description of Conventional Breather Bags

A number of breather bag designs are in use or have been proposed over the years. For example, see the breather bag constructions illustrated and described in U.S. Pat. Nos. 2,899,884; 3,193,058; 3,888,288; 4,135,443; and 4,177,844.

Figure 1:
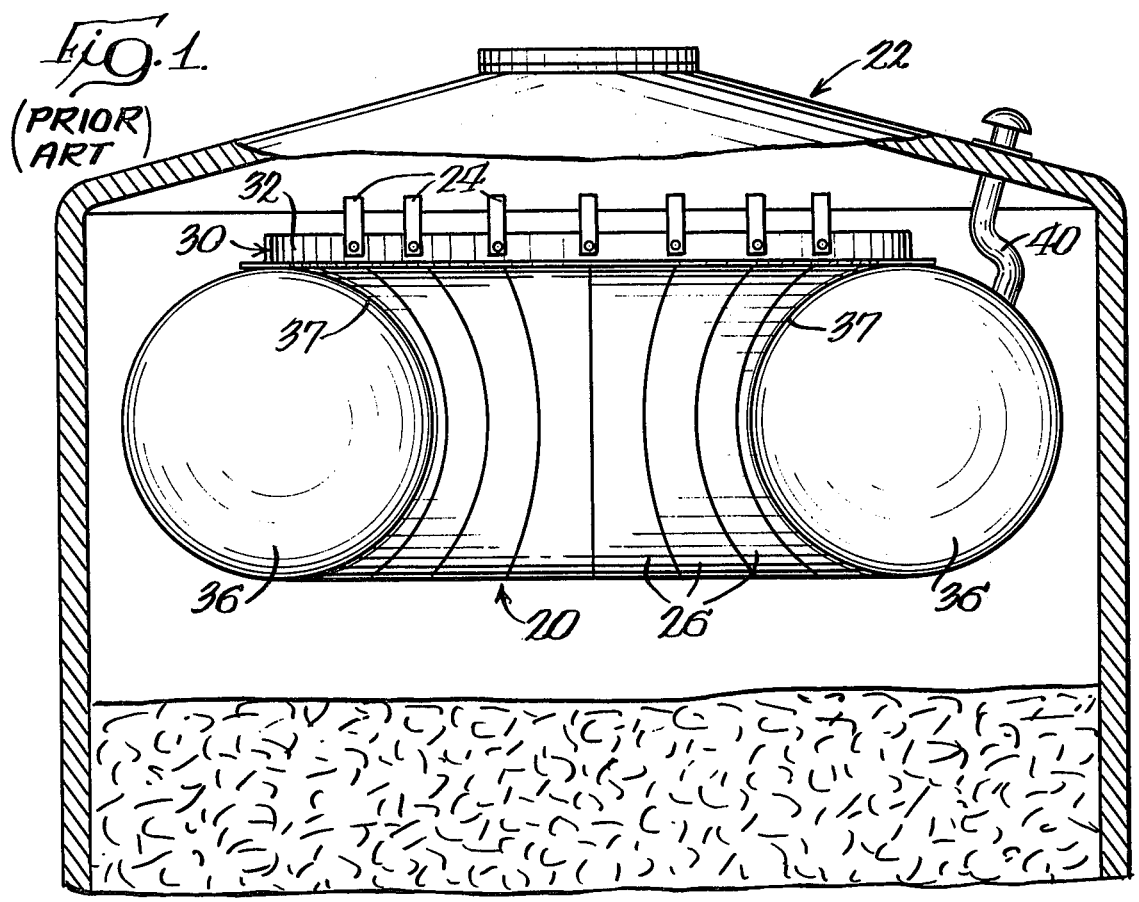
FIG. 1 is a fragmentary, partial cross-sectional elevational view of a sealed silo containing a breather bag of one type of conventional design.

One type of conventional breather bag is manufactured and sold by the assignee of the present invention, Fabrico, 4222 South Pulaski Rd., Chicago, Ill. 60632, U.S.A. This type of bag is illustrated in FIGS. 1–3 and is indicated generally by reference numeral 20 in FIG. 1 where the bag 20 is shown suspended within a silo 22.

The bag is preferably made from a polyvinylchloride material and is suspended from the top of the silo with straps or hangers 24 which may be of suitable conventional design and which are mounted to appropriate structural members within the top of the silo 22.

Figure 2:
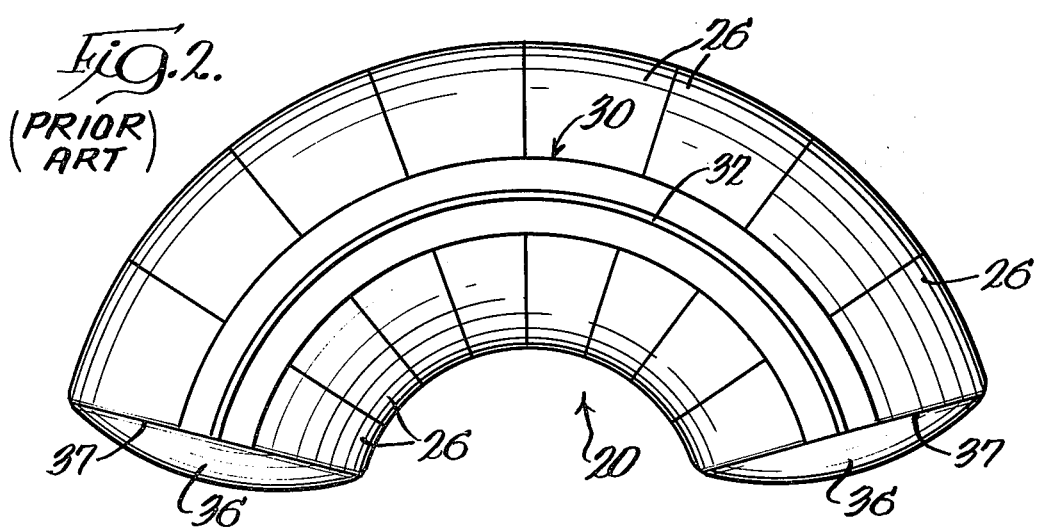
FIG. 2 is a top view of the breather bag illustrated in FIG. 1.
Figure 3:
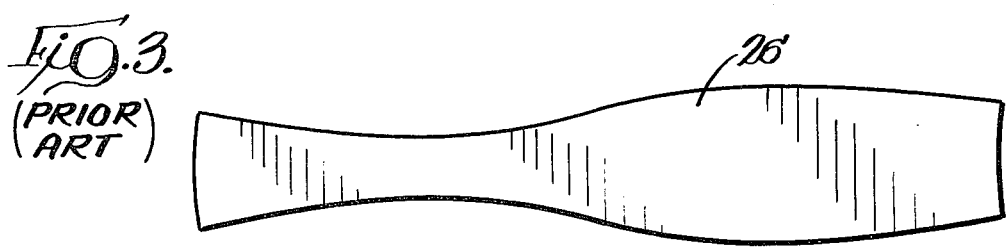
FIG. 3 is a plan view of a typical segment or panel of flexible material, laid out flat, used in the construction of the conventional breather bag illustrated in FIGS. 1 and 2.

As best illustrated in FIG. 2, the bag 20 has an arcuate configuration in plan view. More specifically, the bag has an approximate partial torus or toroidal shape. The bag 20 may also be described as having a weiner-like configuration.

The bag 20 is fabricated from a plurality of panels, strips, or segments 26. One such panel 26, laid out flat, is illustrated in FIG. 3. Such panels 26 are placed side by side with their margins or edges overlapping. The panels 26 are sealed together by suitable means (e.g., with heat or high frequency welding) with a seam along each overlapping margin. The ends of each panel 26 are then sealed to a yoke panel or hanger strip 30 to form an arcuate, tube-like structure. The yoke panel 30 is provided with an upstanding member or collar 32 to which the hanger members or straps 24 may be secured as illustrated in FIG. 1.

As best illustrated in FIGS. 1 and 2, each end of the bag 20 is provided with a circular bulkhead panel 36 which is sealed with a circumferential seam 37 to the peripheral edge of one of the end segments 26. When the bag 20 is inflated, each bulkhead panel 36 bulges outwardly to define a convex or partial spherical surface.

As best illustrated in FIG. 1, the breather bag has an aperture which is connected by means of a vent tube 40 which passes through the roof of the silo 22. The bag 20 also typically includes a second collar 39 (not illustrated) at the other end of the bag to accommodate attachment of the bag at either end to an existing silo vent 40. Also, the bag typically includes conventional tether eyelets on the bottom of the bag (not illustrated) through which ropes may be passed for pulling the deflated breather bag out of the center region of the silo when the silo is being filled through an opening at the top of the silo.

Ambient air passes into the bag 20 through the vent 40 whenever the pressure within the silo 22 starts to decrease and passes out of the bag through the vent 40 whenever the pressure within the silo 22 begins to increase.

When the pressure tends to increase in the silo 22, the bag may become almost completely collapsed to thereby provide increased volume within the silo 22 for the expanding gases to thus maintain the internal silo pressure at a level substantially below that which would occur in the absence of such a breather bag 20.

Similarly, when the pressure within the silo 22 tends to decrease, the pressure differential between the ambient atmosphere and the internal silo gases causes the collapsed bag to be filled with ambient air through vent 40. Inflation of the bag 20 will thus substantially diminish the pressure reduction within the silo 22 compared to what would otherwise occur in the absence of such a breather bag 20.

Other designs for a partial toroid breather bag have been proposed wherein the number of flexible panels is substantially less than the number of panels required for the conventional type of bag 20 described above with reference to FIGS. 1-3. Such designs are disclosed in U.S. Pat. No. 3,888,288 (FIGS. 7-9) and U.S. Pat. No. 4,177,844.

Figure 18:
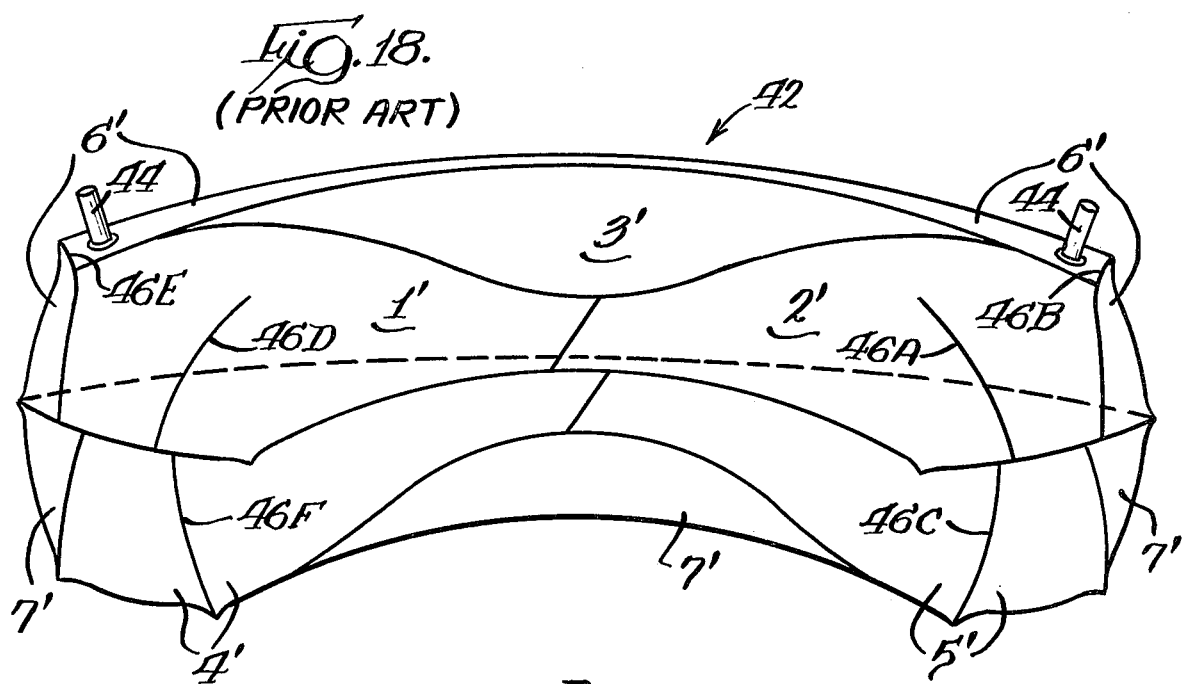
FIG. 18, on the sheet of drawings with FIGS. 4 and 5, is a perspective view of another type of breather bag.

Another partial toroid breather bag design of which the inventors are aware is illustrated in FIG. 18. The bag 42 is shown in FIG. 18 in the inflated condition and comprises seven panels, designated by reference numerals 1'-7', which are fabricated from a suitable thermoplastic material and sealed along their overlapping margins by suitable means (e.g., with heat or high frequency welding). The bag 42 is provided on each end with the usual vent 44 and may include the typical hanger strip or yoke panel (not illustrated) similar to the yoke panel 30 described above for the breather bag 20 with reference to FIGS. 1 and 2.

The bag construction illustrated in FIG. 18 incorporates a large number of seams. Some of the seams function join one panel to an adjacent panel. However, a number of the seams are dart seams within a single panel and are included to help effect the approximation of a toroidal shape for the inflated bag 42. Such dart seams are found at each end of the bag and include dart seam 46A in panel 2', dart seam 46B in panel 6' adjacent panel 2', dart seam 46C in panel 5', dart seam 46D in panel 1', dart seam 46E in panel 6' adjacent panel 1', and dart seam 46F in panel 4'.

Although some of the various breather bag designs described above do have a reduced number of required panels, such designs require relatively complex panel configurations at each end of the bag and also require a relative large number of separate seams at each end of the bag. Further, such designs require a relatively large number of seam welds of three or more panels.

The breather bag illustrated in FIGS. 1-3, as well as other partial torus or weiner-like breather bags being sold today, are typically designed to be accommodated within a silo of a particular internal configuration and having dimensions specified by the silo manufacturer. Typically, the silo manufacturer defines a volumetric envelope for which the breather bag must be designed.

Figure 4:
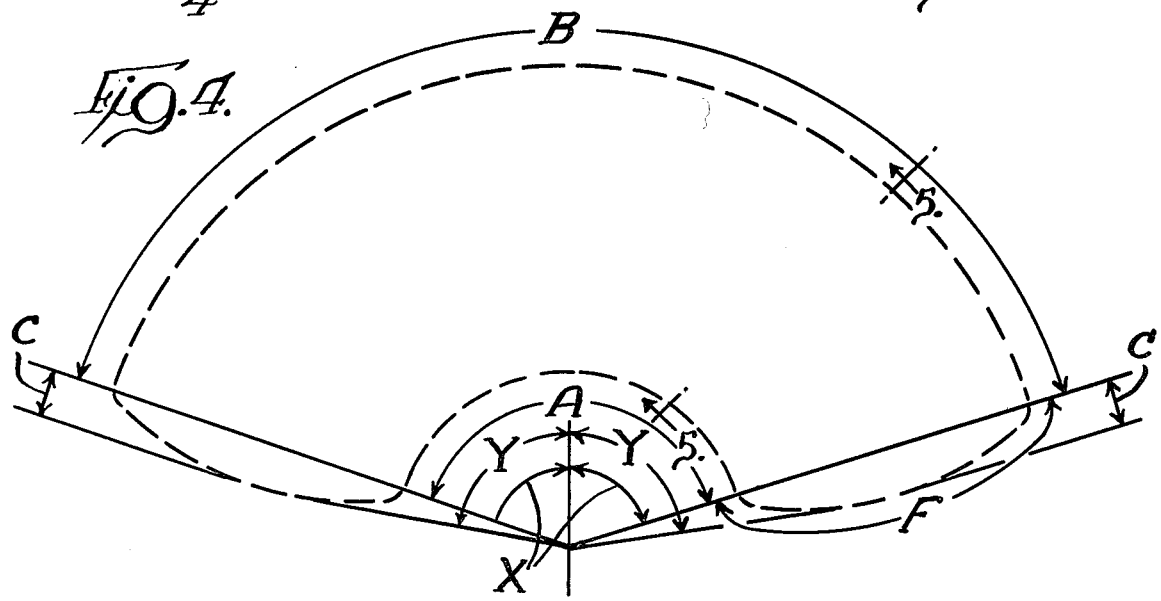
FIG. 4 is a plan view of the volumetric envelope in a silo for which one type of conventional breather bag is designed.
Figure 5:
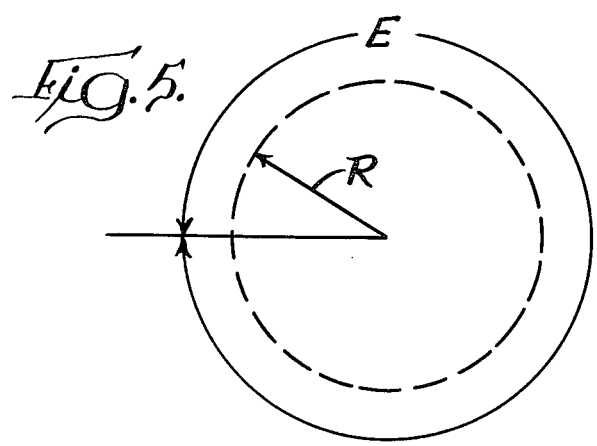
FIG. 5 is a cross-sectional view of the volumetric envelope taken along the plane 5—5 in FIG. 4.

One such volumetric envelope is illustrated in dashed lines in FIGS. 4 and 5. The partial toroidal or torus shape may be substantially defined by (1) an inner arc length A along the inner radius surface or inside concave curvature of the bag, (2) an outer arc length B along the outer convex side surface of the bag; (3) an arc length angle X (d), (4) the bag radius R (FIG. 5), and (5) the bag circumference E (FIG. 5). Further, the convex end surface of each bag can be substantially defined by the additional end length C, by the convex end surface arc length F, and by the difference between the arc length angle Y and the arc length angle X.

For one type of silo of a specific size in widespread use, the above-discussed breather bag volumetric envelope parameters have the following average nominal values:

A: 101 inches
B: 272 inches
C: 10 inches
E: 218 inches
F: 71.5 inches
R: 34.8 inches
X: 70.5°
Y: 80°

The above-described breather bag illustrated in FIGS. 1-3, as well as some other types of breather bags marketed today, are fabricated in accordance with the volumetric envelope parameters set forth above with reference to FIGS. 4 and 5. It would be desirable to provide an improved bag having substantially the same shape and volume but having a construction that would have a greater capability to withstand abuse during and after installation, and which would be less likely to fail even when the bag is not installed or hung properly from the top of the silo.

Further, it would be desirable to provide an improved bag that, for a given volume, (1) would have the approximate shape of the envelope illustrated in FIGS. 4 and 5 but that would have a reduced ratio of seam length to volume, (2) could be fabricated from panels of relatively simple shapes, and (3) could be fabricated with a reduced number of three piece welds.

Description of the Preferred Embodiment of the Present Invention

The bag of the present invention, in its inflated condition, is illustrated in FIGS. 6-9 and is designated generally therein by reference numeral 50. For ease of illustration, certain conventional features, such as one or more vent or breather conduits, tether eyelets, and various alternate hanger/yoke designs are not illustrated. These features are described in the aforementioned patents, are well-known to those skilled in the art of breather bag design, and are of conventional design. Accordingly, a detailed illustration and description of such features is unnecessary here.

When inflated, the breather bag 50 has a partial toroid or torus configuration. The bag 50 may also be described as having a weiner-like configuration. The bag 50 may have a greater or lesser length than illustrated. In the illustrated embodiment, the shape and volume of the bag are substantially identical to the shape and volume, respectively, of the volumetric envelope described above with reference to FIGS. 4 and 5. However, the bag 50 may have a greater or lesser volume depending on the size of the silo.

As best illustrated in FIGS. 6-9, the bag has only four main pieces or panels: a flexible top panel 52, a flexible bottom panel 54, a flexible transition panel 56, and a flexible side panel 58. As illustrated in FIG. 7, the bag 50 is provided with a yoke panel 77 which is sealed to the top panel 52 and by which the bag 50 is suspended from the top of the silo. The yoke panel 77 may be of any suitable conventional design and may include an upstanding collar 78 having apertures 79 for accommodating connection of the bag to supporting hooks, members, or hanging straps. Alternatively, the yoke panel 77 may be replaced by a plurality of separate pieces of material (not illustrated) that each define an aperture for being connected to the support structure.

The top panel 52 and the bottom panel 54 are sealed together with a seam 60 along overlapping edges on the outer convex side surface as best illustrated in FIGS. 6 and 8. The flexible transition panel 56 is sealed to the top panel 52 with a seam 62 along overlapping edges as best illustrated in FIG. 7. The side panel 58 extends from one end of the bag to the other end along the inner radius or inside concave curvature of the bag and is sealed with a seam 64 to a peripheral edge of the transition panel 56, to the top panel 52, and to the bottom panel 54.

As best illustrated in FIGS. 6 and 9, the side panel 58 defines at each end of the bag a generally convex end surface 70. The side panel 58 further includes a dart seam 72 at each end in the convex end surface 70 as best illustrated in FIGS. 7 and 9. As further illustrated in FIGS. 10 and 11, the dart seam is formed from a V-shaped notch 74 in the end of the side panel 58. It is believed that the novel convex end surface 70 on each end of the side panel 58 provides a better method of, and structure for, distributing the inflation loading throughout the bag panels compared to prior art four-panel bag designs.

As best illustrated in FIGS. 10 and 11, just the peripheral edges or margins of the adjacent panels are overlapped and sealed. Preferably, the panels are fabricated from a flexible thermoplastic material such as polyvinylchloride. The panels are joined together in a manner that seals them with a seam along the overlapping edges. Preferably, such a sealed seam is effected with conventional high frequency welding—a process well-known to those skilled in the art of fabricating breather bags.

With the novel design of the bag of the present invention, the number of welds of three or more overlapping panels is minimized so that the number of stress discontinuities and potential stress failure points is reduced.

For illustrative purposes, FIG. 13 shows three typical panels welded together to form a so-called "T-zone" weld. The three panels, $P_1$, $P_2$, and $P_3$ (which are not intended to represent any specific three panels on bag 50), are arranged so that the peripheral edges or margins overlap in a T-shape. A portion of the overlapping regions of the panels of $P_1$ and $P_3$ are first sealed with a suitable conventional weld $W_1$. Subsequently, the panel $P_2$ is sealed to the underlying panels $P_1$ and $P_3$ with a second weld $W_2$. The resulting composite weld has a sideways T-shape in FIG. 13. It is to be realized that, depending upon the actual shape of the overlapping edges of the panels, the two welds, such as $W_1$ and $W_2$, may not necessarily form a T-shaped configuration, but may instead form a Y-shaped configuration or may have some irregular shape comprising three welds or sealed seams which intersect at a common region, point, or zone. Such welds or sealed seams may be curved or arcuate as may be necessary to follow the curvature of the margins or peripheral edges of the panels.

As illustrated in FIGS. 6-11, and with reference to the schematic diagram of FIG. 12, it is seen that the edges of three of the bag panels overlap at a common point, T-zone, or region at only six locations on the bag 50. Specifically, with reference to FIG. 12, the side panel 58 overlaps, and is sealed to, the bottom panel 54 and the top panel 52 at the point or zone indicated by reference numeral 81. Similarly, at the other end of the bag, the side panel 58 overlaps, and is sealed to, the bottom panel 54 and the top panel 52 at the point or zone designated by reference numeral 82. Further, each end of the transition panel 56 overlaps, and is sealed to, the top panel 52 and the side panel 58 at the zones designated by reference numerals 83 and 84.

Finally, in addition to the four T-zone welds 81, 82, 83 and 84 described above, there are two additional T-zone welds at each end of the bag 50. Specifically, a T-zone weld exists at each outer end of the dart seam 72 on each end of the side panel 58. The T-zone weld on one end is designated in FIG. 12 by reference numeral 85 and on the other end by reference numeral 86.

With continued reference to FIG. 12, the dart seam 72 on the lefthand end of the bag comprises two overlapping marginal portions of the side panel 58 and the distal end of that seam overlaps the edge of the top panel 52 *above* the outer convex side surface seam 60 of the top and bottom panels. On the other end of the bag (on the righthand end as viewed in FIG. 12), the dart seam 72 has the same basic construction but the distal end of the seam 72 overlaps an edge of the bottom panel 54 *below* the outer convex side surface seam 60 of the top and bottom panels.

The novel offset orientation of the two dart seams 72 in the side panel 58 thus eliminates an additional, fourth layer of material at the T-zone weld points 81 and 86 at the ends of the bag. Thus, at the most, there are only three overlapping layers of material at any of the six T-zone weld points formed by any three of the four main panels in the bag 50.

FIGS. 14–17 separately illustrate each of the four main panels that are joined together to form the bag 50 of the present invention. As illustrated in FIG. 14, the top panel 52 has a flat shape, before being joined to the other panels, defined by a top panel arcuate outer side edge 101 and a top panel arcuate inner side edge 103 spaced from the top panel arcuate outer side edge. The top panel 52 further has at each end a top panel first straight end edge 105 extending from the top panel arcuate outer side edge 101 and a top panel second straight end edge 107 extending from the top panel arcuate inner side edge 103 to the top panel first straight end edge 105 to form an angle.

As best illustrated in FIG. 15, the transition panel 56 has a flat shape, before being joined to the other panels, defined by an arcuate outer edge 109 and a generally straight side edge 111 which terminates on each end of the transition panel at the transition panel arcuate outer edge 109.

As best illustrated in FIG. 16, the side panel 58 has a flat shape, before being joined to the other panels, defined by a pair of spaced-apart side panel longitudinal edges 113 and 115 which define between them a reduced width central region 117 and two increased width end regions 121. The side panel 58 includes in each end region 121 the above-discussed V-shaped notch 74. This notch 74 is seen to be defined by two inwardly directed side panel straight edges 123 and 125 forming an acute angle. The notch 74 on one end is tilted slightly upwardly relative to a longitudinal plane of symmetry while the notch 74 on the other end is tilted slightly downwardly. This provides for the offset of the ends of the formed dart seam 72 (FIG. 12) with respect to the outer convex side surface seam 60.

As thus illustrated in FIG. 17, the bottom panel 54 has a flat shape, before being joined to the other panels, defined on one side by an arcuate outer side edge 127 and on the other side by a straight side edge 129 spaced from the arcuate outer side edge 127. The bottom panel 54 further has at each end a bottom panel first straight end edge 131 extending from the bottom panel arcuate outer side edge 127 and a bottom panel second straight end edge 133 extending from the bottom panel straight side edge 129 to the bottom panel first straight end edge 131 to form an angle.

The above-described panels are assembled to form the novel bag 50 illustrated in the inflated condition in FIGS. 6–12. Specifically, the straight edges 123 and 125 defining the notch 74 at each end of the side panel 58 are joined to form the dart seam 72 (FIG. 7) in the increased width end regions 121 of the side panel. This permits the first and second straight end edges 105 and 107, respectively, of the top panel 52 to be joined with seams to the increased width end regions 121 of the side panel 58 at each end.

The arcuate outer edge 109 of the transition panel 56 is joined with a seam to the arcuate inner edge 103 of the top panel 52 while the generally straight side edge 111 of the transition panel 56 is joined with a seam to a portion of one of the side panel longitudinal edges, say edge 113, along the reduced width central region 117 of the side panel 58. The straight side edge 129 of the bottom panel 54 is joined with a seam to a portion of the other of the side panel longitudinal edges, say edge 115, along the reduced width central region 117. The first end second straight end edges 131 and 133, respectively, of the bottom panel 54 are joined with a seam to the increased width regions 121 at each end of the side panel 58.

The top panel 52 and the bottom panel 54 are joined with a single seam along their arcuate outer side edges 101 and 127, respectively. The resulting top and bottom panel single seam (seam 60 in FIGS. 8 and 12) intersects each end of the side panel 58 at a point offset from the side panel dart seams (seams 72 in FIG. 12).

When the breather bag of the present invention is fabricated from the above-described panels having the dimensions necessary to form the bag with a shape and volume corresponding to the volumetric envelope described above with reference to FIGS. 4 and 5, the bag has a total seal length less than other similar types of bags known by the applicants as being currently marketed.

Further, with respect to other four panel, partial torus bags, such as the bag illustrated in FIG. 2 of U.S. Pat. No. 4,177,844, it is seen that the bag of the present invention has only one dart seam at each end of the bag rather than a plurality of small seams. With the bag of the present invention, the total seam length is less for a given volumetric envelope and the number of T-zone, or 3-layer, welds is considerably reduced.

The total length of the seals for the preferred embodiment of the bag of the present invention illustrated in FIGS. 6–17, when fabricated to conform to the volumetric envelope described above with reference to FIGS. 4 and 5, is only 1,031 inches. Although the total seam length might be further reduced by using fewer main panels (e.g., three instead of four), the four panel design of the bag of the present invention has been found to inflate in close conformity with the above-described volumetric envelope and in a manner that is believed to minimize the number of regions of higher stress. Thus, the four panel structure of the present invention is believed to provide a desirable solution to the problem of attempting to optimize counterveiling design considerations in toroidal breather bags.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A tubluar silo breather bag adapted to be inflated to a generally partial torus or weiner-like configuration; said bag comprising when inflated a flexible top panel and a flexible bottom panel sealed together with a seam along overlapping edges on the outer convex side surface, a flexible transition panel sealed to said top panel with a seam along overlapping edges, and a flexible side panel extending from one end of the bag to the other end along the inner concave curvature of the bag, said side panel defining at each end of the bag a generally convex end surface extending from said inner curvature to said outer convex side surface with only one dart seam in said convex end surface and being sealed with a seam along its peripheral edges to said top, bottom and transition panels.

2. The bag in accordance with claim 1 in which said side panel has a generally horizontal axis of symmetry and in which said side panel further includes a dart seam at each end in said convex end surface, each said dart seam originating within said side panel generally along the horizontal axis of symmetry of said side panel and extending to a peripheral edge of said side panel offset from said outer convex side surface seam of said top and bottom panels.

3. The bag in accordance with claim 2 in which said dart seam on one end of said side panel is angled downwardly and terminates at said bottom panel below said outer convex side surface seam of said top and bottom panels, said dart seam at the other end of said side panel is angled upwardly and terminates at said top panel above said outer convex side surface seam of said top and bottom panels.

4. A tubular silo breather bag having a generally partial torus or weiner-like configuration when inflated, said bag comprising at least top, bottom, transition and side panels of flexible material; said panels being joined together with sealed seams along the edges of the panels;
   said bottom panel having a flat shape, before being joined to other panels, defined on one side by an arcuate outer side edge and on another side by a straight side edge spaced from said arcuate outer side edge, said bottom panel having at each end a bottom panel first straight end edge extending from said bottom panel arcuate outer side edge and a bottom panel second straight end edge extending from said bottom panel straight side edge to said bottom panel first straight end edge;
   said top panel having a flat shape, before being joined to other panels, defined by a top panel arcuate outer side edge and a top panel arcuate inner side edge spaced from said top panel arcuate outer side edge, said top panel having at each end a top panel first straight end edge extending from said top panel arcuate outer side edge and a top panel second straight end edge extending from said top panel arcuate inner side edge to said top panel first straight end edge;
   said transition panel having a flat shape, before being joined to other panels, defined by a transition panel arcuate outer side edge and a transition panel generally straight side edge which terminates on each end of the transition panel at said transition panel arcuate outer side edge; and
   said side panel having a flat shape, before being joined to other panels, defined by a pair of arcuate spaced-apart, side panel longitudinal edges defining between them a reduced width central region and increased width end regions, said side panel having in each end region a V-shaped notch extending between said side panel longitudinal edges and defined by two inwardly directed side panel straight edges forming an acute angle, said increased width end regions having a continuous convex arcuate periphery defined by said side panel longitudinal edges except at said notch,
   whereby said panels may be assembled with
   (1) said side panel notch straight edges at each end of said side panel being joined to form a single dart seam,
   (2) said first and second straight end edges of said top panel being joined with seams to said increased width end regions of said side panel at each end,
   (3) said arcuate outer side edge of said transition panel being joined with a seam to said top panel arcuate inner side edge,
   (4) said generally straight side edge of said transition panel being joined with a seam to a portion of one of said side panel longitudinal edges along said reduced width central region,
   (5) said bottom panel straight side edge being joined with a seam to a portion of the other of said side panel longitudinal edges along said reduced width central region,
   (6) said first and second straight end edges of said bottom panel being joined with seams to said increased width end regions of said side panel at each end, and
   (7) said top and bottom panels being joined with a single seam along their arcuate outer side edges, said top and bottom panel single seam intersecting each end of said side panel at a point offset from said side panel dart seams.

5. The bag in accordance with claim 1 in which said side panel further includes a dart seam at each end in said convex end surface, each said dart seam originating within one of said side panel convex end surfaces and extending to a peripheral edge of said side panel offset from said outer convex side surface seam of said top and bottom panels.

* * * * *